US005745756A

United States Patent [19]
Henley

[11] Patent Number: 5,745,756
[45] Date of Patent: Apr. 28, 1998

[54] METHOD AND SYSTEM FOR MANAGING MOVEMENT OF LARGE MULTI-MEDIA DATA FILES FROM AN ARCHIVAL STORAGE TO AN ACTIVE STORAGE WITHIN A MULTI-MEDIA SERVER COMPUTER SYSTEM

[75] Inventor: Martha Rose Henley, Morgan Hill, Calif.

[73] Assignee: International Business Machines Corporation, Armonk, N.Y.

[21] Appl. No.: 669,663

[22] Filed: Jun. 24, 1996

[51] Int. Cl.$^6$ .................... G06F 7/00; G06F 7/06
[52] U.S. Cl. .................. 395/620; 395/616; 395/621
[58] Field of Search ................... 395/620, 621, 395/616, 614, 200.61, 672

[56] References Cited

U.S. PATENT DOCUMENTS

| | | | |
|---|---|---|---|
| 4,145,724 | 3/1979 | Medding et al. | 360/92 |
| 5,038,211 | 8/1991 | Hallenbeck | 358/142 |
| 5,121,483 | 6/1992 | Monahan et al. | 395/275 |
| 5,168,353 | 12/1992 | Walker et al. | 358/86 |
| 5,182,640 | 1/1993 | Takano | 358/86 |
| 5,187,750 | 2/1993 | Behera | 382/7 |
| 5,197,047 | 3/1993 | Witheridge et al. | 369/4 |
| 5,197,055 | 3/1993 | Hartung et al. | 369/34 |
| 5,239,650 | 8/1993 | Hartung et al. | 395/650 |
| 5,276,867 | 1/1994 | Kenley et al. | 395/600 |
| 5,311,423 | 5/1994 | Clark | 364/401 |
| 5,317,732 | 5/1994 | Gerlach, Jr. et al. | 395/600 |
| 5,341,474 | 8/1994 | Gelman et al. | 395/200 |
| 5,367,330 | 11/1994 | Haave et al. | 348/7 |
| 5,371,532 | 12/1994 | Gelman et al. | 348/7 |
| 5,383,112 | 1/1995 | Clark | 364/401 |
| 5,404,505 | 4/1995 | Levinson | 395/606 |
| 5,418,622 | 5/1995 | Takeuchi | 358/335 |
| 5,442,389 | 8/1995 | Blahut et al. | 348/7 |
| 5,485,606 | 1/1996 | Midgdey et al. | 395/600 |
| 5,491,810 | 2/1996 | Allen | 395/444 |
| 5,506,986 | 4/1996 | Healy. | 395/600 |
| 5,586,264 | 12/1996 | Belknap et al. | 395/200.08 |
| 5,603,058 | 2/1997 | Belknap et al. | 395/855 |
| 5,630,104 | 5/1997 | Ottesen et al. | 395/500 |
| 5,644,715 | 7/1997 | Baugher | 395/200.04 |
| 5,644,766 | 7/1997 | Coy et al. | 395/620 |
| 5,668,948 | 9/1997 | Belknap et al. | 395/200.61 |

OTHER PUBLICATIONS

R.D. Christman, "Experience with File Migration", Los Alamos National Laboratory, 1988, pp. 1–12.

D. Arneson, "Mass Storage Archiving in Network Environments", 1988, pp. 45–49.

B. Brawn et al. "Data Migration and Staging Facility" vol. 16, No. 1, 1973, pp. 205–208.

"On–Line Measurement of Paging Behavior by the Multi–valued MIN Algorithm," L. Belady and F. Palermo, IBM Res. Develop., Jan. 1994.

"A Study of Replacement Algorithms for A Virtual–Storage Compure," L. A. Belady, IBM Systems Journal, vol. 5, No. 2—1966.

Primary Examiner—Thomas G. Black
Assistant Examiner—Michael J. Wallace, Jr.
Attorney, Agent, or Firm—Esther E. Klein; Andrew J. Dillon

[57] ABSTRACT

A method and system for managing the movement of large video data files from an archival tape storage to an active hard-disk storage within a video server computer system are disclosed. In accordance with the method and system of the present invention, a storage list, a lookahead list, and a candidate list are produced. Each item on the storage list represents a multimedia data file stored within an active storage medium. Each item on the lookahead list represents a multimedia data file that will be played at a date and time according to a play schedule. Each item on the candidate list represents a candidate multimedia data file for removal from the active storage medium because it has already been played. After a simulation of a multiple of events utilizing the storage list, the lookahead list, and the candidate list, an output schedule file based on the results from the simulation is developed. This output schedule file includes a date and time for the future execution of each of the multiple of events such that each staging begins at the earliest possible time and ends before the next staging begins.

18 Claims, 5 Drawing Sheets

Fig. 4

| 21 | 22 | 23 | 24 | 25 | 26 | 27 | 28 |
|---|---|---|---|---|---|---|---|
| FORWARD POINTER | BACKWARD POINTER | PLAY BEGIN DATE/TIME | PLAY END DATE/TIME | STAGE BEGIN DATE/TIME | PLAY DURATION | FILE LENGTH | FILE TITLE |

| 31 | 32 | 33 | 34 | 35 | 36 | 37 | 38 |
|---|---|---|---|---|---|---|---|
| FORWARD POINTER | BACKWARD POINTER | PLAY BEGIN DATE/TIME | PLAY END DATE/TIME | STAGE BEGIN DATE/TIME | PLAY DURATION | FILE LENGTH | FILE TITLE |

| 41 | 42 | 43 | 44 | 45 | 46 | 47 | 48 | 49 | 50 |
|---|---|---|---|---|---|---|---|---|---|
| FORWARD POINTER | BACKWARD POINTER | PLAY BEGIN DATE/TIME | PLAY END DATE/TIME | STAGE BEGIN DATE/TIME | PLAY DURATION | FILE LENGTH | FILE TITLE | POINTER | NEXT RERUN TIME |

↳ 40

METHOD AND SYSTEM FOR MANAGING MOVEMENT OF LARGE MULTI-MEDIA DATA FILES FROM AN ARCHIVAL STORAGE TO AN ACTIVE STORAGE WITHIN A MULTI-MEDIA SERVER COMPUTER SYSTEM

BACKGROUND OF THE INVENTION

1. Technical Field

The present invention relates to a method and system for data processing in general and, in particular, to a method and system for file management within a video server computer system. Still more particularly, the present invention relates to a method and system for managing the movement of large multimedia data files from an archival storage to an active storage within a multimedia server computer system.

2. Description of the Prior Art

Many computer applications require their data files to be stored in a relatively fast medium, such as hard disks, in order to meet the access performance requirements of the application. However, because of the high cost associated with fast storage medium, the hard disks within a computer system available for storage typically amount to only a very small fraction of the total file volume. The remaining majority of the data files have to be stored in a relatively low-cost medium, such as magnetic tapes. The drawback of such a system is that a subset of the total data file volume must constantly be loaded back to the hard disks for a particular execution. Because the access speed may be slow for the low-cost storage medium, the process of data transfer between the fast storage medium and the slow storage medium can become the bottle-neck of the computer system. Hence, the challenge is to move the data files from a slow archival tape storage to a high-speed active hard-disk storage in an efficient manner before these data files are needed.

In some cases, the usage of data files is not known in advance, which means the subset of data files that will be required in any future execution of the application is not known until the execution begins. However, in other cases, the subset of data files that will be needed for each future execution of the application is known well in advance. An example of the latter type of application is a multimedia server that is utilized to play multimedia data files or video data files according to a predetermined broadcasting schedule. In such an application, if a multimedia data file is residing on the archival tape storage, the multimedia data file must be moved to the active hard-disk storage within the multimedia server before the predetermined broadcasting time.

Moving multimedia data files from an archival tape storage to an active hard-disk storage takes a long time (typically equivalent to the playtime of the multimedia data file itself), and it is expected that several multimedia server systems would share the same archival tape storage or that a single multimedia server would deliver multiple channels of multimedia data simultaneously. The long elapsed time associated with each movement of a data file, the finite bandwidth available for transferring data files, and the fact that multiple multimedia server systems may share the same archival tape storage make the problem of optimizing a staging schedule a tricky one (note: staging is a term in the art referring to the process of transferring multimedia data files from an archival tape storage to an active hard-disk storage). Further, the number of multimedia data files and frequency of access to these multimedia data files make it impossible for a human to determine which multimedia data file is the best to delete from the hard-disk storage in order to make room for other essential multimedia data file(s) to be staged from the archival tape storage and to determine when to begin a stage operation or in what order should these multimedia data files be staged.

The process of multimedia data file management for an active hard-disk storage of a multimedia server system is analogous to the process of data management for a cache memory within a data processing system. For both the multimedia server system and the data processing system, the goal is to keep the data that will be reused in the near future in the fast-access medium (i.e., the hard disk or the memory cache), and discard those data that will not be reused in the near future in order to make room for other data. Cache memory replacement algorithms such as "first-in-first-out" (delete oldest data first) or "least recently used" (delete least recently used data first) are useful when there is no knowledge of the future access requirement of these data. However, these replacement algorithms are relatively inefficient if compared to what can be accomplished when the future access requirement of the data is known, such as in the case of a multimedia server. Consequently, it would be desirable to provide a more suitable method and system for managing the movement of large multimedia data files from a tape archival storage to an active hard-disk storage within a multimedia server computer system when the future access requirements to these multimedia data files are known.

SUMMARY OF THE INVENTION

In view of the foregoing, it is therefore an object of the present invention to provide an improved method and system for data processing.

It is another object of the present invention to provide an improved method and system for file management within a video server computer system.

It is yet another object of the present invention to provide an improved method and system for managing the movement of large multimedia data files from an archival tape storage to an active hard-disk storage within a multimedia server computer system.

In accordance with the method and system of the present invention, a storage list, a lookahead list, and a candidate list are produced. Each item on the storage list represents a multimedia data file stored within an active storage medium. Each item on the lookahead list represents a multimedia data file that will be played at a date and time according to a play schedule. Each item on the candidate list represents a candidate multimedia data file for removal from the active storage medium because it has already been played. After a simulation of a multiple of events utilizing the storage list, the lookahead list, and the candidate list, an output schedule file based on the results from the simulation is developed. This output schedule file includes a date and time for the future execution of each of the multiple of events such that each staging begins at the earliest possible time and ends before the next staging begins.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is a block diagram of a storage list item in accordance with a preferred embodiment of the present invention;

FIG. 5 is a block diagram of a lookahead list item in accordance with a preferred embodiment of the present invention;

FIG. 6 is a block diagram of a candidate list item in accordance with a preferred embodiment of the present invention.

DETAILED DESCRIPTION OF PREFERRED EMBODIMENT

The present invention may be executed in a variety of computers under a number of different operating systems. The computer may be, for example, a personal computer, a mini-computer, or a mainframe computer. In addition, the computer may be a stand-alone system or part of a network such as a local-area network (LAN) or a wide-area network (WAN). For the purpose of illustration, a preferred embodiment of the present invention, as described below, is implemented on a multimedia server computer system, such as the MediaStreamer™ Multimedia Subsystem with MultiMedia Archive manufactured by International Business Machines Corporation.

Figure 1:
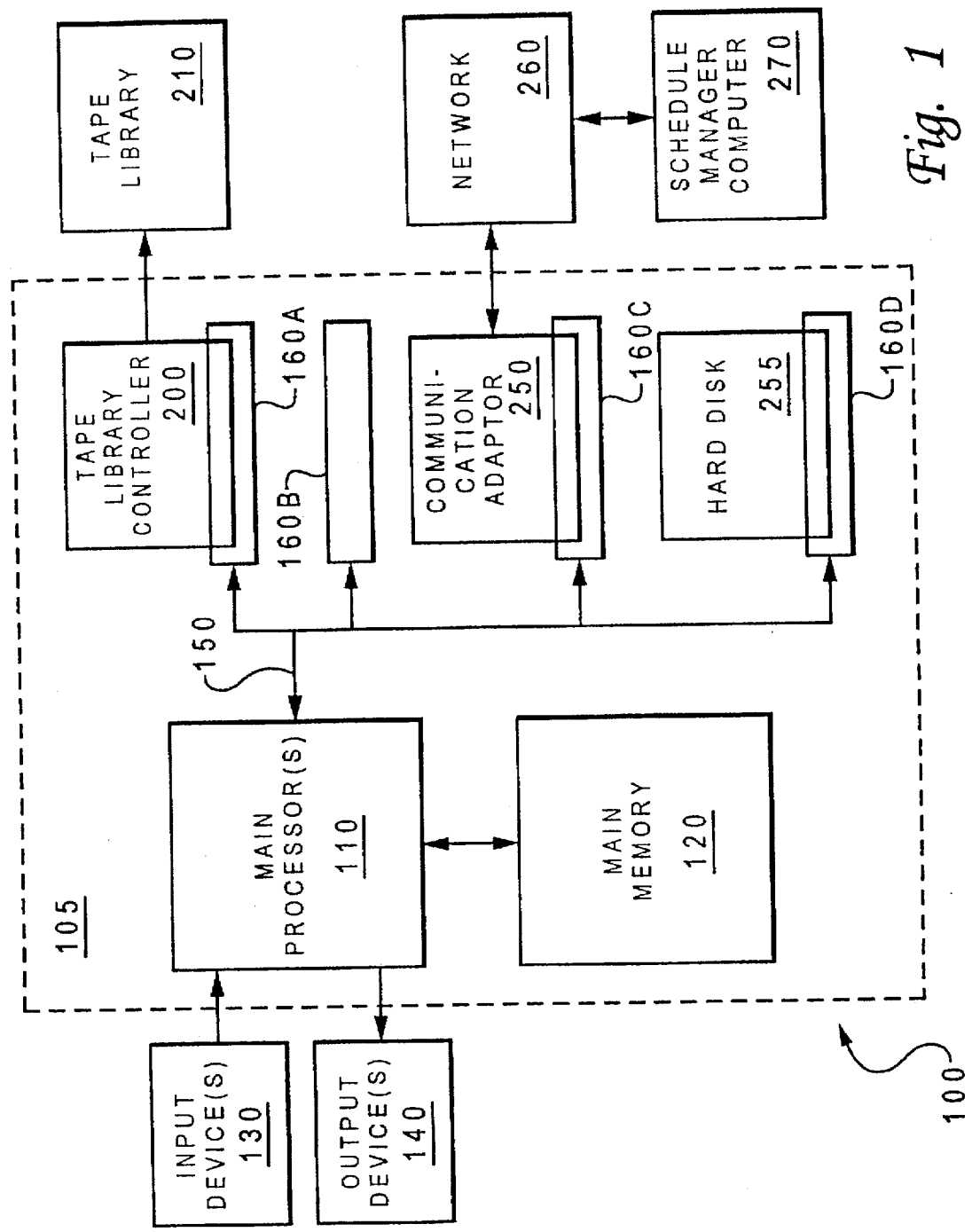
FIG. 1 is a block diagram of a multimedia server computer that may utilize a preferred embodiment of the present invention.

Referring now to the drawings and in particular to FIG. 1, there is illustrated a block diagram of multimedia server computer 100 which may utilize a preferred embodiment of the present invention. Multimedia server computer 100 typically includes main processor(s) 110 coupled to a main memory 120 within processor unit 105, having input device(s) 130 and output device(s) 140 attached thereto. Main processor(s) 110 may include a single processor or multiple processors. Input device(s) 130 may include a keyboard, a keypad, or other types of input devices. Output device(s) 140 may include a display monitor, a printer, or other types of output devices. A number of peripheral devices may be connected to adaptor slots 160A, 160B, 160C, and 160D in order to provide communications with main processor 110 via internal bus 150. As shown in FIG. 1, tape library controller 200, communication adaptor 250, and hard disk 255 are connected to adaptor slots 160A, 160C, and 160D, respectively, while adaptor slot 160B remains open. Tape library controller 200 receives instructions from main processor 110 via internal bus 150, thereby rendering data transfer between hard disk 255 and tape library 210. Alternatively, tape library 210 may be attached to network 260. Communication adaptor 250 may communicate with other data processing systems, such as schedule manager computer 270, across network 260. Typically, information from hard disk(s) 255 is transferred to main memory 120 to be utilized by main processor(s) 110. However, a different type of memory known as a cache memory (not shown) may also be present, normally between main processor(s) 110 and main memory 120, for enhancing the speed of memory access by main processor(s) 110.

Figure 2:
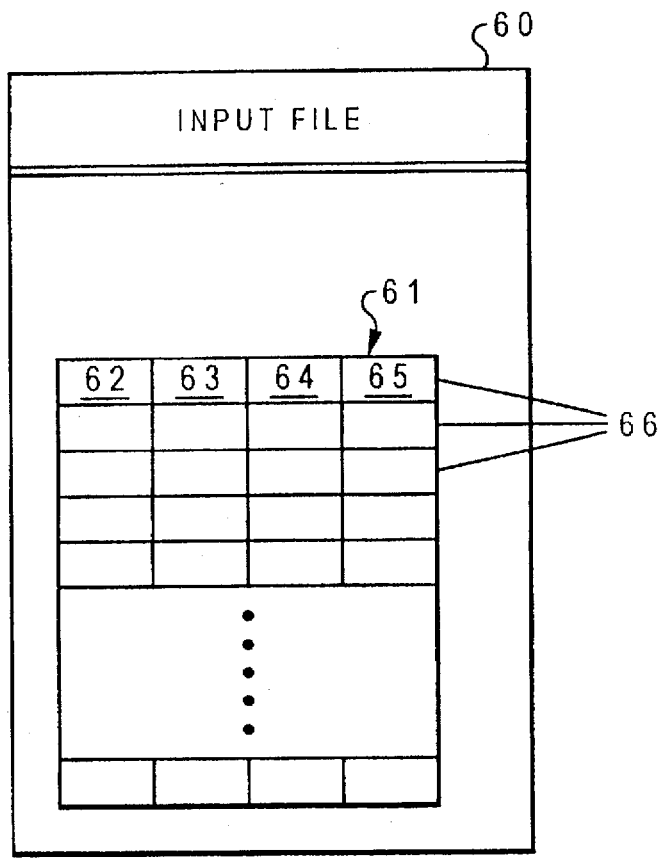
FIG. 2 is a block diagram of an input file and an output schedule file, in accordance with a preferred embodiment of the invention.

With reference to FIG. 2, there is illustrated a block diagram of an input file and an output schedule file, in accordance with a preferred embodiment of the invention. As mentioned previously, the future access requirements to multimedia data files are known for the present invention and such knowledge is available to the multimedia server computer through an input file 60. Input file 60 contains a play schedule (or broadcasting schedule) 61 which lists a daily or weekly play timetable for each play item 66. Each play item 66 within play schedule 61 may contain a title field 62 for the title of the multimedia data file, a date/time field 63 indicating the date and time in which the multimedia data file is to be played, a length field 64 indicating the length of the multimedia data file in seconds, and a size field 65 indicating the length of the multimedia data file in bytes.

Several data values are required by a preferred method of the present invention. These data values, which may be available in the form of constants or variables provided from a user via an input device 130, includes amount of storage remaining in hard disk 255 in hours, time required to mount and position a tape in tape library 210 in seconds (setup time), staging rate between tape library 210 and hard disk 255, time ahead of play that a multimedia data file should be in hard disk 255 (playtime margin), etc.

An output schedule file 70 for the staging and the removal of multimedia data files is produced via the simulation of the contents within hard disk 255 over time, according to a preferred embodiment of the invention. Output schedule file 70 contains three kinds of events, namely, a play event, a delete event, and a stage event. A play event is for playing a multimedia data file stored in hard disk 255. A play event includes a multimedia data file title, date/time the multimedia data file is to be played, length of the multimedia data file in seconds, and size of the multimedia data file in bytes. A delete event is for removing a multimedia data file from hard disk 255. A delete event includes a multimedia data file title, date/time the multimedia data file is to be removed from hard disk 255, and size of the multimedia data file. A stage event is for staging a multimedia data file from tape library 210 to hard disk 255. A stage event includes a multimedia data file title, date/time the multimedia data file is to be staged, length of the multimedia data file in seconds, and size of the multimedia data file in bytes. Any future movement of multimedia data files between tape library 210 and hard disk 255, such as staging and removal, will be managed according to the sequence of these three events within output schedule file 70 once this output schedule file 70 is generated. In addition, output schedule file 70 can be utilized in computer server 100 or schedule manager computer 270.

Figure 3:
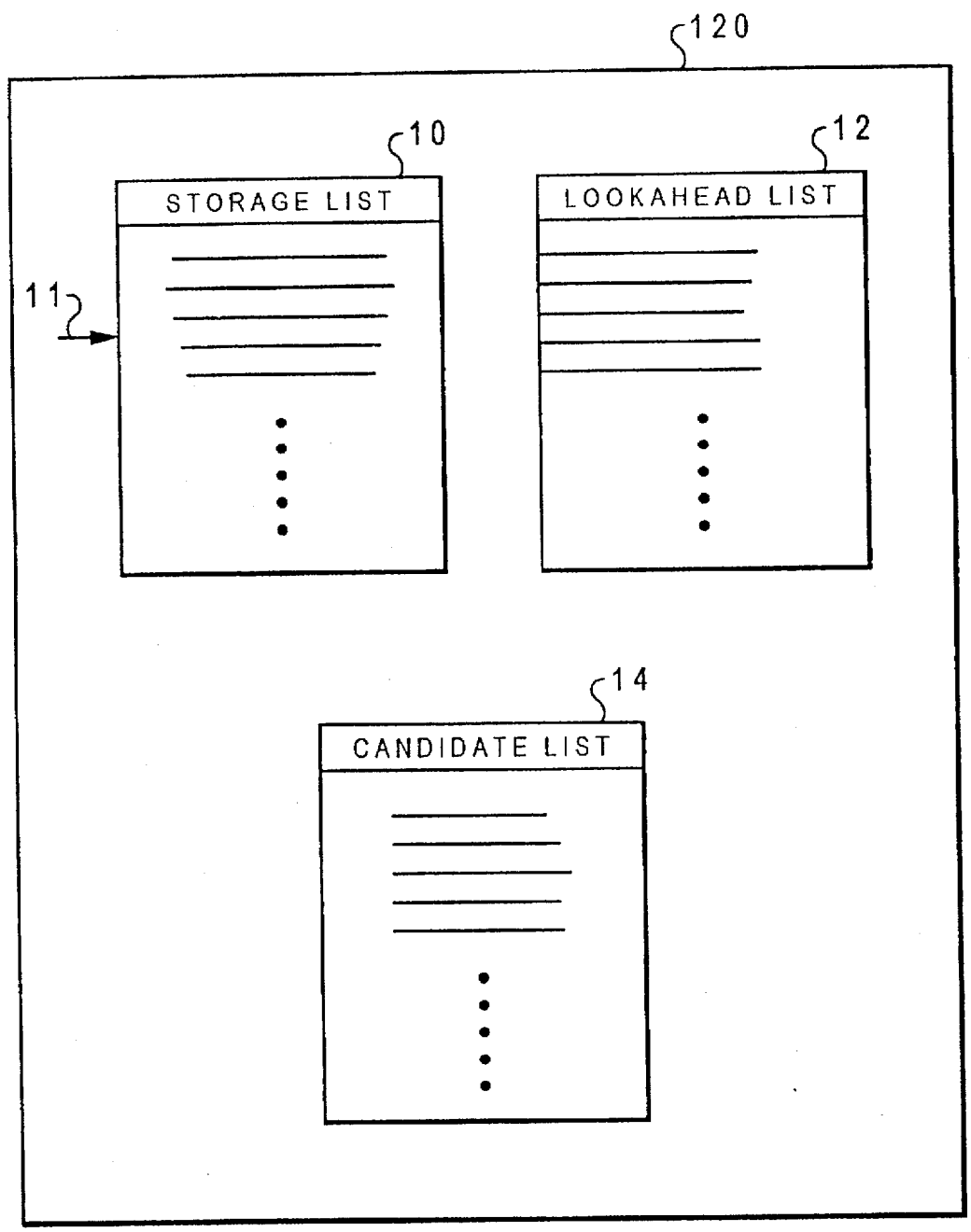
FIG. 3 is a block diagram of a storage list, a lookahead list and a candidate list, in accordance with a preferred embodiment of the invention.

Referring now to FIG. 3, there is illustrated a block diagram of a storage list 10, a lookahead list 12, and a candidate list 14, in accordance with a preferred embodiment of the invention. Each of storage list 10, lookahead list 12, and candidate list 14 is a doubly linked list. All lists 10, 12, and 14 contain a number of items which will be described below in detail.

Storage list 10 keeps track of the multimedia data files that are currently residing on hard disk 255 of multimedia server computer 100. All items within storage list 10 are maintained according to date and time order for the multimedia data file broadcast to complete. This is the earliest time that a multimedia data file may be removed from hard disk 255. A pointer 11 pointing into storage list 10 is kept for indicating which multimedia data file will be played next. All multimedia data files preceding pointer 11 have already been played while those following pointer 11 are yet to be played. Storage list 10 is generated at the inception to reflect the existing multimedia data files in hard disk 255 and is modified accordingly as simulated time progresses.

Lookahead list 12 contains a play schedule (similar to play schedule 61 in input file 60) for several days ahead of the multimedia data file currently ready to play. The size of lookahead list 12 may vary, depending on the available resources within the multimedia server computer. Lookahead list 12 is organized by must-stage time, i.e., the time a staging must absolutely begin in order for it to finish completely before broadcasting. This time is calculated by subtracting the time required to stage the multimedia data file from the multimedia data file play date/time (a playtime margin may also be subtracted). To simulate staging a multimedia data file into hard disk 255, an item is moved from the top of lookahead list 12 to the appropriate place in storage list 10. Then, another item is read from the play schedule to add to the appropriate place on lookahead list 12.

As mentioned previously, each item in the play schedule may contain a unique title for each multimedia data file, a date and time for the multimedia data file to play, the length of the multimedia data file in seconds, and the size of the multimedia data file in bytes. The size of the multimedia data file can be calculated if the bit rate of the compressed multimedia data file is known.

Candidate list 14 is developed each time that a staging operation is required, necessitating the removal of one or more multimedia data files from hard disk 255 to make room for new multimedia data files. Candidate list 14 is arranged in ascending order by the date/time of the next (future) play time of the multimedia data file. Thus, the best candidate for removal is at the bottom of candidate list 14 and the worst candidate is at the top.

Although storage list 10, lookahead list 12, and candidate list 14 are depicted as doubly linked circular lists for ease of programming and manipulation, these lists 10, 12, and 14 can be implemented as simple-linked list or arrays. Further, all the fields in these lists 10, 12, and 14, as depicted, are simply a preferred embodiment, and some fields can be deleted or replaced with other fields without departing from the spirit and scope of the present invention.

With reference now to FIG. 4, there is depicted a block diagram of an item from storage list 10, in accordance with a preferred embodiment of the invention. As shown, each storage list item 20 is comprised of eight fields. As the names imply, forward pointer field 21 and backward pointer field 22 point to the previous and next items on the storage list, respectively. Play begin date/time field 23 depicts the date and time for the multimedia data file to begin broadcasting while play end date/time field 24 depicts the date and time when the multimedia data file ends. In most circumstances, the date within play end date/time field 24 is the same as that within play begin date/time field 23. Stage begin date/time field 25 contains the latest date and time that the multimedia data file must begin staging in order to have time for the multimedia data file to be ready for broadcasting. Play duration field 26 indicates the length of the playtime of the multimedia data file and is usually depicted in terms of seconds. Also, the length of the multimedia data file in bytes is indicated in multimedia data file length field 27. Finally, a file title or ID field 28 is utilized to identify the title of each multimedia data file.

Referring now to FIG. 5, there is illustrated a block diagram of an item from lookahead list 12, in accordance with a preferred embodiment of the invention. Lookahead list item 30 is comprised of the same eight fields as those items in the storage list. Forward pointer field 31 and backward pointer field 32 point to the previous and next item on the look-ahead list, respectively. Play begin date/time field 33 depicts the date and time for the multimedia data file to begin broadcasting while play end date/time field 34 depicts the date and time when the multimedia data file ends. Stage begin date/time field 35 contains the latest date and time that the multimedia data file must begin staging in order to have the multimedia data file ready for broadcasting. Play duration field 36 indicates the length of the play time of the multimedia data file in terms of seconds, and file length field 37 indicates the length of the multimedia data file in terms of bytes. Finally, a file title or ID field 38 is utilized to identify the title of each multimedia data file.

With reference now to FIG. 6, there is illustrated a block diagram of an item from candidate list 14, in accordance with a preferred embodiment of the present invention. As shown, candidate list item 40 contains essentially the same fields as storage list item 20 and lookahead list item 30. Forward pointer field 41 and backward pointer field 42 point to the previous and next items on the candidate list, respectively. Play begin date/time field 43 depicts the date and time for the multimedia data file to begin broadcasting while play end date/time field 44 depicts the date and time when the broadcasting of the multimedia data file ends. Stage begin date/time field 45 contains the latest date and time that the multimedia data file must begin staging in order to have the multimedia data file ready for broadcasting. Play duration field 46 indicates the length of the play time of the multimedia data file in terms of seconds and file length field 47 indicates the length of the multimedia data file in terms of bytes. A file title or ID field 48 is utilized to identify the title of each multimedia data file. Finally, candidate list item 40 is complete with a pointer field 49 and a next rerun time field 50. Pointer field 49 is utilized to point to this item on storage list 20 and next rerun time field 50 indicates the rerun time of a multimedia data file.

Figure 7:
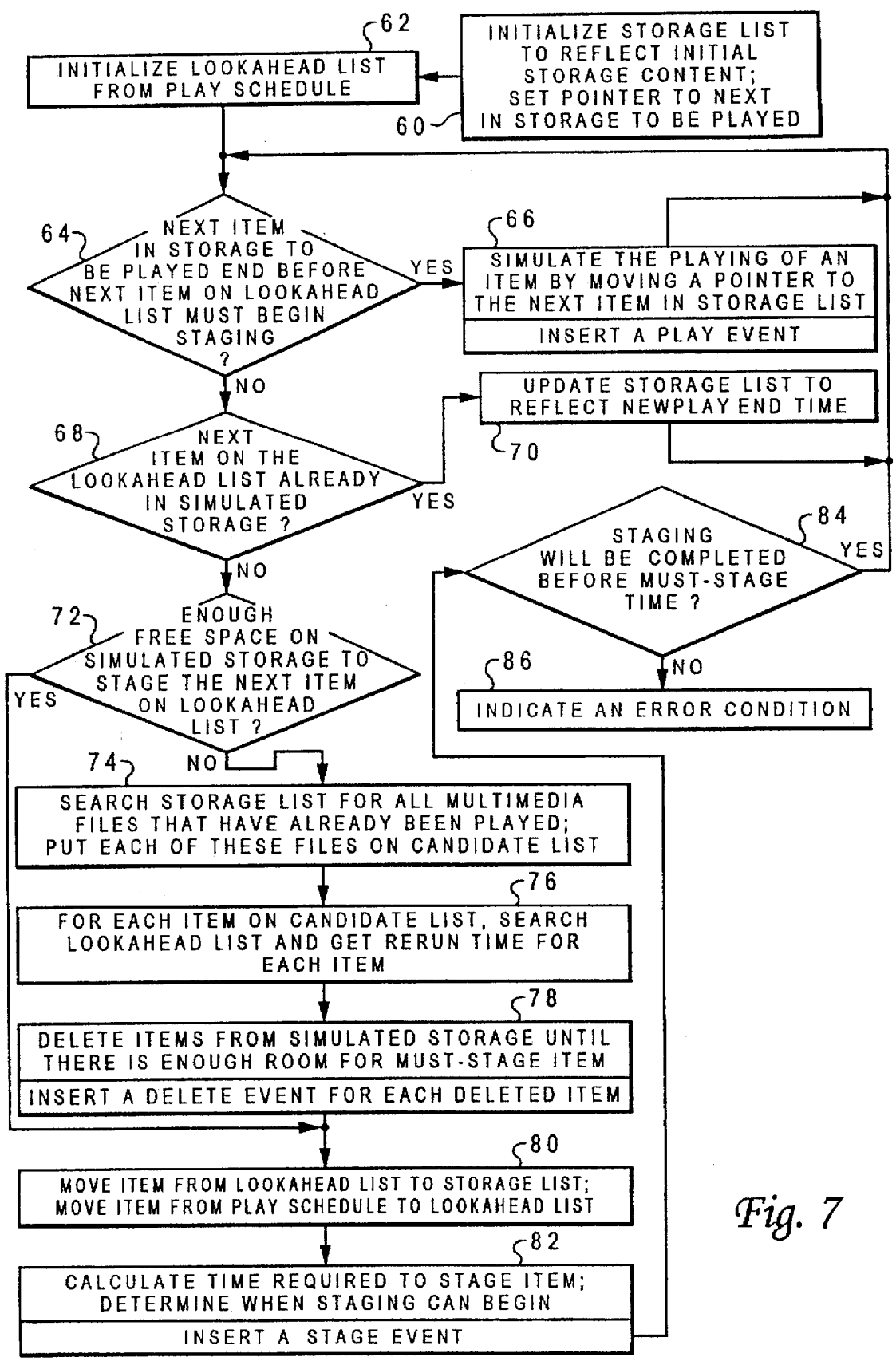
FIG. 7 is a high-level flow diagram of a method for managing movement of large multimedia data files from an archival storage to an active storage within a multimedia server computer system, according to a preferred embodiment of the invention.

Referring now to FIG. 7, there is illustrated a high-level flow diagram of a method for managing movement of large multimedia data files from an archival storage to an active storage within a multimedia server computer system, according to a preferred embodiment of the invention. Starting at block 60, the storage list is initialized in order to reflect the initial storage content of the hard-disk storage, and the pointer within the storage list is set to point at a next item to be played. Next, the lookahead list is also initialized by the filling of play items from the play schedule, as illustrated in block 62. These play items are placed into the lookahead list in the order of must-stage time. The must-stage time is the time the multimedia data file must be played minus the time required to perform the staging along with a configurable safety margin.

A determination is then made as to whether the next item in the storage list to be played will end before the must-stage time of a next item on the lookahead list or not, as shown in block 64. If the next item in the storage list to be played will end before the must-stage time of the next item on the lookahead list, then move the pointer within the storage list to the next item in the storage list. Next, a play event is inserted into the output schedule file, as illustrated in block 66, and the process returns back to block 64. Otherwise, if the next item in the storage list to be played will not end before the must-stage time of the next item on the lookahead list, another determination is made as to whether the next item in the lookahead list is already in the hard-disk storage or not, as depicted in block 68. If the next item in the lookahead list is already in the hard-disk storage, then update the storage list to reflect the new play end time, as shown in block 70, and the process returns back to block 64. Otherwise, if the next item on the lookahead list is not in the hard-disk storage, then yet another determination is made as to whether there is enough free space in the hard-disk storage to stage the next item on the lookahead list or not, as illustrated in block 72. If there is enough free space in the hard-disk storage to stage the next item on the lookahead list, then the process proceeds to block 80.

Otherwise, if there is not enough free space in the hard-disk storage to stage the next item on the lookahead list, then the storage list is searched for all the multimedia data files that have already been played and each of these multimedia data files is moved to the candidate list, as depicted in block 74. All items on the candidate list are candidates for deletion. Hence, for each item on the candidate list, the lookahead list is searched in order to obtain the next time that particular item will be played again (rerun time) and the items in the candidate list are arranged in the order of rerun time, as shown in block 76. Next, items are deleted from the hard-disk storage by starting with the item on the candidate list that will be rerun most remote in the future, until there is enough free space for the item that must be staged. Then, a delete event is inserted into the output schedule file for each item deleted, as shown in block 78. The item is then moved from the top of the lookahead list to an appropriate position on the storage list that is arranged in the order by the play end time of the item. Afterwards, another item is read from the play schedule and is put in the lookahead list, as depicted in block 80. The time required for staging is calculated and then the time that staging can begin is also determined. Then, a stage event is inserted into the output schedule file, as shown in block 82. (note: Staging cannot begin before any deletion that is required to make room for the multimedia data file, nor can staging begin before the completion of a previous staging.)

Finally, a determination is made as to whether the staging will be completed before the item is needed, as illustrated in block 84. If the staging will be completed before the item is needed, then the process returns back to block 64. Otherwise, if the staging will not be completed before the item is needed, an error condition is indicated, as shown in block 86.

With this method, the future date, time, and order for each multimedia data file to be played, to be deleted from the hard disk, and to be staged from the tape storage within the multimedia server computer system can be obtained. They are represented in the form of a play event, a delete event, and a stage event in the output schedule file as previously mentioned and shown in FIG. 2.

As has been described, the present invention provides an improved method for managing movement of large multimedia data files from an archival tape storage to an active hard-disk storage within a multimedia server computer system. This invention provides the ability to determine the best resident multimedia data file to be deleted from the hard disk based on a lookahead list whose length is dependent on the amount of memory available. Further, this invention can schedule these deletes and schedule the appropriate future time to begin each stage operation. If a play schedule is provided as input for which there are simply not enough hours in the day to accomplish all required staging, this invention detects the error well in advance of the actual broadcast time so that changes can be made accordingly. This invention can handle sufficient schedule complexity, such as variable-length usage times and variable-length storage consumption to be useful in products that manage tape libraries and multimedia server computers.

While the invention has been particularly shown and described with reference to a preferred embodiment, it will be understood by those skilled in the art that various changes in form and detail may be made therein without departing from the spirit and scope of the invention.

What is claimed is:

1. A method for efficiently managing the movement of large multimedia data files from an archival storage medium to an active storage medium within a computer server, said method comprising the computer server-implemented steps of:

producing a storage list, wherein each item in said storage list represents a multimedia data file stored within said active storage medium;

producing a lookahead list, wherein each item in said lookahead list includes a date and time for a multimedia data file to be played;

producing a candidate list, wherein each item in said candidate list represents a candidate multimedia data file for removal from said active storage medium;

simulating a plurality of events utilizing said storage list, said lookahead list and said candidate list to determine the time required for the execution of each of said plurality of events, wherein said plurality of events includes a play event, a delete event, and a staging event; and developing an output schedule file based on the results from said simulating step, wherein said output schedule file includes a date and time for the future execution of each of said plurality of events such that each staging begins at the earliest possible time and ends before the next staging begins.

2. The method for efficiently managing the movement of large multimedia data files from an archival storage medium to an active storage medium within a computer server according to claim 1, wherein said producing a lookahead list step includes the step of producing a lookahead list from a play schedule.

3. The method for efficiently managing the movement of large multimedia data files from an archival storage medium to an active storage medium within a computer server according to claim 1, wherein said simulating step further includes the step of moving each item associated with a multimedia data file that has already been played from said storage list to said candidate list.

4. The method for efficiently managing the movement of large multimedia data files from an archival storage medium to an active storage medium within a computer server according to claim 1, wherein said simulating step further includes the step of deleting items from said candidate list until there is enough space within said active storage medium for staging.

5. The method for efficiently managing the movement of large multimedia data files from an archival storage medium to an active storage medium within a computer server according to claim 1, wherein said simulating step further includes the step of calculating the transfer time and the play time for each multimedia data file.

6. A computer system for efficiently managing the movement of large multimedia data files from an archival storage medium to an active storage medium within a computer server, said method comprising the steps of:

means for producing a storage list, wherein each item in said storage list represents a multimedia data file stored within said active storage medium;

means for producing a lookahead list, wherein each item in said lookahead list includes a date and time for a multimedia data file to be played;

means for producing a candidate list, wherein each item in said candidate list represents a candidate multimedia data file for removal from said active storage medium;

means for simulating a plurality of events utilizing said storage list, said lookahead list and said candidate list to determine the time required for the execution of each of said plurality of events, wherein said plurality of events includes a play event, a delete event and a staging event; and means for developing an output schedule file based on the results from said simulating step, wherein said output schedule file includes a date and time for the future execution of each of said plurality of events such that each staging begins at the earliest possible time and ends before the next staging begins.

7. The computer system for efficiently managing the movement of large multimedia data files from an archival storage medium to an active storage medium within a computer server according to claim 6, wherein each item in said storage list is arranged by order of finish play time.

8. The computer system for efficiently managing the movement of large multimedia data files from an archival storage medium to an active storage medium within a computer server according to claim 6, wherein each item in said lookahead list is arranged by order of must-stage time.

9. The computer system for efficiently managing the movement of large multimedia data files from an archival storage medium to an active storage medium within a computer server according to claim 6, wherein each item in said candidate list is arranged in an ascending order of play time.

10. The computer system for efficiently managing the movement of large multimedia data files from an archival storage medium to an active storage medium within a computer server according to claim 6, wherein said archival storage medium is a tape storage.

11. The computer system for efficiently managing the movement of large multimedia data files from an archival storage medium to an active storage medium within a computer server according to claim 6, wherein said active storage medium is a hard-disk drive.

12. The computer system for efficiently managing the movement of large multimedia data files from an archival storage medium to an active storage medium within a computer server according to claim 6, wherein said means for simulating further includes means for moving each item associated with a multimedia data file that has already been played from said storage list to said candidate list.

13. The computer system for efficiently managing the movement of large multimedia data files from an archival storage medium to an active storage medium within a computer server according to claim 6, wherein said means for simulating further includes means for deleting items from said candidate list until there is enough space within said active storage medium for staging.

14. The computer system for efficiently managing the movement of large multimedia data files from an archival storage medium to an active storage medium within a computer server according to claim 6, wherein said means for simulating further includes means for calculating the transfer time and the play time for each multimedia data file.

15. A computer program product residing on a computer usable medium for efficiently managing the movement of large multimedia data files from an archival storage medium to an active storage medium within a computer server, said computer program product comprising:

program code means for producing a storage list, wherein each item in said storage list represents a multimedia data file stored within said active storage medium;

program code means for producing a lookahead list, wherein each item in said lookahead list includes a date and time for a multimedia data file to be played;

program code means for producing a candidate list, wherein each item in said candidate list represents a candidate multimedia data file for removal from said active storage medium;

program code means for simulating a plurality of events utilizing said storage list, said lookahead list and said candidate list to determine the time required for the execution of each of said plurality of events, wherein said plurality of events includes a play event, a delete event and a staging event; and program code means for developing an output schedule file based on the results from said simulating step, wherein said output schedule file includes a date and time for the future execution of each of said plurality of events such that each staging begins at the earliest possible time and ends before the next staging begins.

16. The computer program product residing on a computer usable medium for efficiently managing the movement of large multimedia data files from an archival storage medium to an active storage medium within a computer server according to claim 15, wherein said program code means for simulating further includes program code means for moving each item associated with a multimedia data file that has already been played from said storage list to said candidate list.

17. The computer program product residing on a computer usable medium for efficiently managing the movement of large multimedia data files from an archival storage medium to an active storage medium within a computer server according to claim 15, wherein said program code means for simulating further includes program code means for deleting items from said candidate list until there is enough space within said active storage medium for staging.

18. The computer program product residing on a computer usable medium for efficiently managing the movement of large multimedia data files from an archival storage medium to an active storage medium within a computer server according to claim 15, wherein said program code means for simulating further includes program code means for calculating the transfer time and the play time for each multimedia data file.

\* \* \* \* \*